United States Patent [19]
Okogbaa et al.

[11] Patent Number: 5,871,248
[45] Date of Patent: Feb. 16, 1999

[54] ROBOT GRIPPER

[75] Inventors: O. Geoffrey Okogbaa, Tampa; Reijo Olavi Hiltunen, Mango; Ronald Carl Petrus, Tampa, all of Fla.

[73] Assignee: University of South Florida, Tampa, Fla.

[21] Appl. No.: 719,754

[22] Filed: Sep. 25, 1996

Related U.S. Application Data

[60] Provisional application No. 60/004,326 Sep. 26, 1995.

[51] Int. Cl.$^6$ ........................................... B25J 15/02
[52] U.S. Cl. ..................... 294/86.4; 294/99.1; 294/902; 294/907; 901/34; 901/39
[58] Field of Search .................. 294/86.4, 98.1, 294/99.1, 119.1, 119.3, 902, 907; 901/31, 32, 34, 39, 46

[56] References Cited

U.S. PATENT DOCUMENTS

| | | | |
|---|---|---|---|
| 2,742,316 | 4/1956 | Phillips | 294/119.1 X |
| 2,782,066 | 2/1957 | Lord | 294/119.1 X |
| 3,494,654 | 2/1970 | Gould et al. | 294/902 X |
| 3,675,962 | 7/1972 | Simpson | 294/902 X |
| 4,410,210 | 10/1983 | de Sivry et al. | 294/902 X |
| 4,740,025 | 4/1988 | Nelson | 294/902 X |
| 4,852,928 | 8/1989 | Monforte | 294/902 X |
| 5,092,645 | 3/1992 | Okada . | |

FOREIGN PATENT DOCUMENTS

| | | | |
|---|---|---|---|
| 626947 | 8/1978 | U.S.S.R. | 294/902 |
| 1034896 | 8/1983 | U.S.S.R. | 294/902 |
| 1313699 | 5/1987 | U.S.S.R. | 294/902 |
| 1335449 | 9/1987 | U.S.S.R. | 294/902 |
| 1761462 | 9/1992 | U.S.S.R. | 294/902 |

OTHER PUBLICATIONS

Ishiguro, et al., "Developmeant of Real Time Sensor Feedback Robot", SAE Technical Paper Series, 1990.
Wolffenbuttel, "Integrated Micromechanical Sensors and Actuators in Silicon", Mechatronics, vol. 1, No. 4 pp. 371–391, 1991.
Uldry, et al., "Developing Conductive Elastomers for Applications in Robotic Tactile Sensing", Advanced Robotics, vol. 6, No. 2, pp. 255–271, 1992.
Gorhe, et al., "Tactile Sensor State of the Art", University of Washington Library, pp. 149–155, 1987.
Corsi, "Smart Sensors", SPIE, vol. 1512, Infared and Optoelectronic Materials and Devices, pp. 53–59, 1991.
Rossi, "Artificial Tactile Sensing and Haptic Perception", Intrument Science and Technology, pp. 1003–1016, 1991.
Hackwood, et al., "Randomizing Field", The International Journal of Robotics, pp. 48–50.
Lefevre, et al., "Fuzzy Internal Models in Vision Systems Modelling", IEEE/RSJ International Workshop on Intelligent Robots and Systems IROS, pp. 105–110, 1991.

(List continued on next page.)

*Primary Examiner*—Johnny D. Cherry
*Attorney, Agent, or Firm*—John E. Miller; Calfee, Halter & Griswold LLP

[57] ABSTRACT

A robot gripper comprising a pair of gripper surfaces with flexible, non-elastic membranes disposed on each gripper surface respectively, these membranes being comprised of cubic cells filled with compressible fluid, so that when each gripper surface makes contact with the object to be lifted, they simultaneously compress and lift the object whereby the friction between the object and the gripper surfaces generates a shear force which distorts the membranes. As the compression and lifting forces are simultaneously increased, the distortion to the membranes will also increase until the pressure inside the cubic cells is large enough to provide sufficient friction force to lift the object.

8 Claims, 2 Drawing Sheets

OTHER PUBLICATIONS

Guckel, "Silicon Microsensors: Construction, Design and Performance", Microelectronic Engieering, pp. 387–398, 1991.

Danel, et al., "Quartz: A Material for Microdevices", IOP Publishing Ltd, pp. 187–197, 1991.

Kazaryan, "Thin–Film Capacitance Pressure Transducers", Plenum Publishing Corporation, pp. 1008–1011, 1991.

Bol'shakova, et al., "Investigation of the Dyanamic Characteristics of Germanium Resistance Strain Gauges In A Pulse Mode", Plenum Publishing Corporation, pp. 247–253, 1991.

Kyberd, et al., "Object–Slip Dectection During Manipulation Using A Derived Force Vector", Mechatronics, vol. 2, No. 1, pp. 1–13, 1992.

Akasofu, et al., "A Thin–Film Variable Capacitance Shear Force Sensor For Medical and Robotics Application", Annual International Conference of the IEEE/Engineering In Medicine and Biology Society, vol. 13, No. 4, pp. 1601–1602, 1991.

Lee, et al., "A Biopolar Integrated Slicon Pressure Sensor", Sensors and Actuators A, pp. 1–7, 1992.

Dario, "Tactile Sensing: Technology and Application*", Sensors and Actuators A., pp. 251–256, 1991.

Fukuda, et al, "Sensing and Control of Robotic Manipulator by Neural Network", Nagoya University, Dept. of Mechanical Engineering, pp. 985–989, 1991.

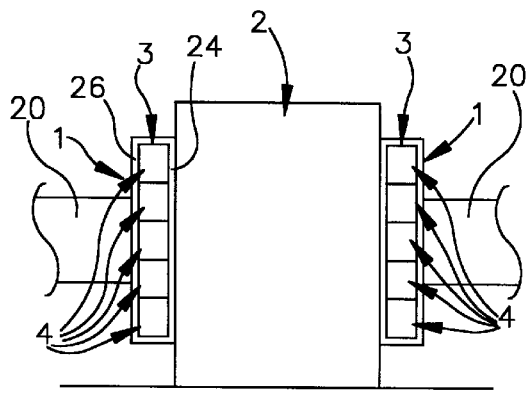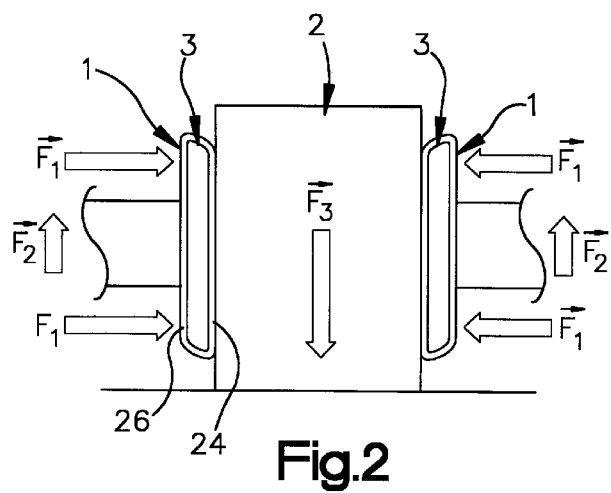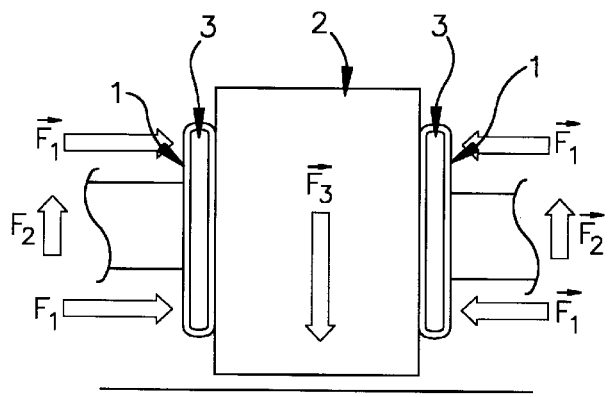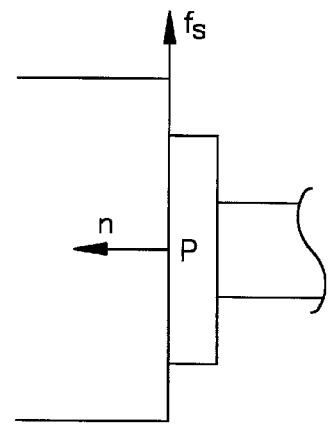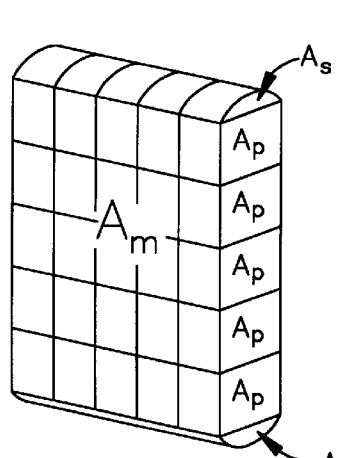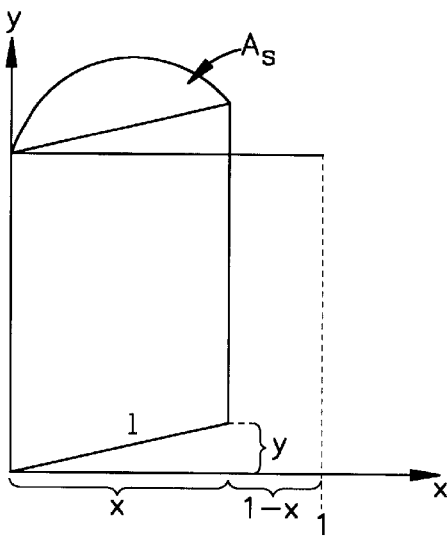

ROBOT GRIPPER

The present application is based on provisional application Ser. No. 60/004,326, filed Sep. 26, 1995, the benefit of which is hereby claimed.

TECHNICAL FIELD

This invention relates to handling materials. More specifically, it discloses a robot gripper.

In order to expand the use of robots in different applications, the adaptability of robots to different task types and environments needs to be increased. One such improvement is in the design and development of the robot gripper to possess more "human like" functions in material handling applications. In such applications it is desirable to have the capacity to handle several types of objects without prior knowledge of the object's weight, size, or dimensions. An example would be in a warehouse with differing part and component sizes, or in a grocery store with a large variety of merchandise. An adaptive gripper would be used to apply enough gripping force to lift the object, but not too much to break it.

The purpose of this invention is to provide a design for a robotics gripper that possesses the above mentioned characteristics including a method to control the gripping force.

SUMMARY OF THE INVENTION

The invention disclosed herein is a Robot gripper which uses a non-elastic, flexible material. This material is disposed on each grippers' surface so that when the gripper surfaces simultaneously apply compression and lifting forces to the object, a shear force will be generated which will distort the material. When the distortion begins to decrease, it will be safe to lift the object.

The method of controlling the gripping force presented by the present invention is similar to the way a human controls the gripping force when he or she lifts an object with unknown weight. The lifting and gripping are simultaneously increased in such a manner that the amount of gripping force needed is felt at all times.

More specifically, the present invention comprises a pair of gripper surfaces with a flexible, non-elastic membrane disposed on each gripper surface respectively. When each gripper surface has made initial contact with the object to be lifted, they simultaneously compress and lift the object. The friction between the gripper surfaces and the object generates a shear force which distorts the membranes. This friction enables the object to be lifted.

The principal aspect of the present invention is its ability to grip objects of varying mass without having prior knowledge of the object's mass. The membranes disposed on each gripper's surface are composed of cubic cells filled with a compressible fluid and whose walls are made of a non-elastic, flexible fabric. It is the applicants' belief that as the gripper surfaces simultaneously apply compression and lifting forces to the object, a shear force will be generated which will distort the membrane, and hence the cubic cells contained therein. As the compression and lifting forces are simultaneously increased, the distortion to the cubic cells will also increase until the distortion of the cubic cells reaches a maximum. The applicants believe that at this point, the pressure inside the cubic cells is large enough to provide sufficient friction force to lift the object. If the cubic cells are further compressed by increasing the gripper force, the distortion decreases because of the tendency of the fluid inside the cubic cells to maximize its volume. The point at which the distortion starts to decrease is the point at which it is safe to lift the object.

BRIEF DESCRIPTION OF THE DRAWINGS

FIG. 1 is a schematic representation of the present invention making initial contact with the object to be gripped.

FIG. 2 is a schematic representation of the present invention simultaneously compressing and lifting the object to be gripped.

FIG. 3 is a schematic representation of the present invention lifting the object.

FIG. 4 is a schematic representation of the normal force and friction force as used in the computer simulation.

FIG. 5 is a schematic representation of the membrane with cubic cells contained therein.

FIG. 6 is a schematic representation of the coordinate system and variables used to derive the volume of a cubic cell in the computer simulation.

DESCRIPTION OF THE PREFERRED EMBODIMENTS

Figure 10:
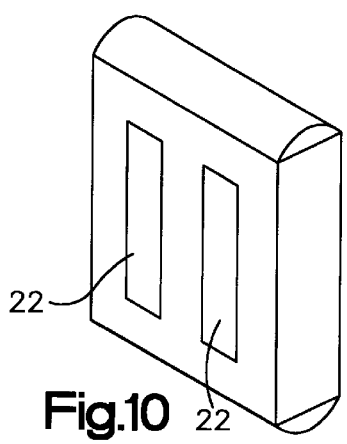
FIG. 10 is a schematic representation similar to FIG. 5 showing a means to monitor the distortion of the flexible non-elastic membrane of FIG. 5.

FIG. 1 depicts the present invention when it makes initial contact with the object to be gripped (2). The gripper surfaces (1) of a means to move the gripper surfaces simultaneously towards the object to be gripped, such as gripper 20, are covered with a flexible, non-elastic membrane (3) composed of cubic cells (4) filled with compressible fluid. A schematic representation of the cubic cells (4) in flexible, non-elastic membrane (3) is shown in FIG. 5, while a thin film variable capacitance shear force sensor 22 attached to such a membrane is shown in FIG. 10. In the preferred embodiment, the compressible fluid may be any gas which exhibits close to ideal gas behavior at one atmosphere pressure, such as air. In the preferred embodiment, the walls of the cubic cells (4) are made of thin, lightweight, flexible, non-elastic fabric having properties similar to the fabric disclosed in U.S. Pat. No. 4,758,465.

FIG. 2 depicts the distortion of the flexible, non-elastic membrane (3), and hence the distortion of the cubic cells (4) contained therein (not shown) when compression force F1 and lifting force F2 are simultaneously applied to object (2). Once gripper surfaces (1) make contact with the object (2) and F1 and F2 are applied to the object (2), the generated friction force F3 between object (2) and the gripper surfaces (1) will produce a shear force which will distort the flexible, non-elastic membranes (3) and hence cubic cells (4) (not shown) contained therein. When this distortion starts to decrease, it is safe to lift the object. Hence, it is important to monitor the amount of distortion in the flexible, non-elastic membranes (3) in a quantitative manner. In the applicants' opinion, a sensor similar to the thin-film variable capacitance shear force sensor for medical and robotics applications disclosed at the Annual International Conference of the IEEE Engineering in Medicine and Biology Society, Vol. 13, Nov. 4, 1991, could be applicable. There, the sensor consisted of five thin gold conductors arranged to form parallel plate capacitors which are 2 mm wide and are connected into a balanced wheatstone bridge configuration. The bridge is initially balanced when the amount of distortion is zero. When a shear force is applied, the bridge is thrown because the distortion in the flexible, non-elastic membranes (3) shifts the plates which make up the parallel plate capacitors. A detector quantifies the imbalance and hence the amount of distortion.

FIG. 3 is a schematic representation of an object (2) being gripped by the present invention. As magnitude of compression force F1 and lifting force F2 increases, the distortion in flexible, non-elastic membrane (3), and hence the cubic cells (4) (not shown) contained therein, decreases. Applicants believe that when the distortion decreases, it is safe to grip the object (2).

As more fully illustrated in FIG. 1, membrane 3 is composed of a plurality of cells 4 each of which defines a front face 24 for operatively engaging the object 2 to be gripped and a rear face 26. Rear face 26 engages or is otherwise in operative relationship with the gripping surfaces 1, which in turn is attached to rods 20. Rods 20 operate to move gripping surfaces 1 and hence membranes 3 into engagement with the object to be gripped, object 2 in the drawings.

As shown in FIG. 2, when compressive and lifting forces are simultaneously applied to object 2 by the inventive robot gripper, membranes 3 distort in that front faces 24 and rear faces 26 of the individual cells move laterally with respect to one another.

More specifically, as the inventive gripper begins its lifting motion as shown in FIG. 2, rear faces 26 of cells 3 move upwardly while front faces 24 do not. This causes a lateral (vertical) shifting of rear faces 26 with respect to front faces 24. Continued increase of the compressive force applied by the gripper, however, causes a corresponding increase of the pressure inside individual cells 3. This increase in pressure, in turn, tends to cause the individual cells to return their original shape, thereby causing the lateral distortion of the individual cells to decrease. At the point where this lateral distortion begins to decrease, which can be sensed by a sensor such as variable capacitance shear force sensor 22 of FIG. 10, object 2 is gripped securely enough so that it can be lifted safely.

In accordance with the present invention, the gripper surface is covered with a membrane comprised of cubic cells filled with compressible fluid. The cells are separated by a flexible but non-elastic material. After the initial contact is made (FIG. 1), the robot applies a force to simultaneously compress and lift the object. The upward lifting motion of the gripper and the downward force resulting from the contact with the object will introduce a shear force to the membrane. This shear force will create distortion of the cells inside the membrane (FIG. 2). As the gripping force and the upward lifting force are simultaneously increased, the distortion will also increase until the friction force is large enough to lift the object. At this point the distortion of the cells is at its maximum. If the cells are further compressed by increasing the gripping force, the distortion decreases because of the tendency of fluid inside the cells to maximize its volume. The magnitude of the distortion is monitored with shear force sensors. The point when the distortion starts to decrease is the point at which it is safe to pick up the object (FIG. 3). The right moment can be determined by observing the zero-crossing of the derivative of the output of the shear force sensors.

For a continuous, smooth lifting, the x and y components of the gripper force vector (compressing and lifting, respectively) has to be calculated in real time. The computational speed available will impose a practical limitation to the lifting speed. The relationship between the lifting and compressing components of the force vector must ensure that the friction force will increase enough to prevent slippage.

If the movement of the gripper in the x and y directions (compressing and lifting) is incremental rather than continuous, the spatial resolution of the robot determines the size of the cells. The incremental motion of the gripper needs to be small compared to the size of the cells in order for the robot to distinguish between objects.

Materials Selection

To realize the design described, the following materials, components, and sensors can be used.

The outer surface of the gripper should be equipped with a sensor to detect the initial contact. When the gripper makes the initial contact with the object, it will stop the movement of the side which will make the contact first, then close the gap on the opposite side. This will position the gripper around the object without disturbing the object's balance. A suitable sensor for this purpose is a Piezoelectric Tactile Sensor made of Polyvinylidene Fluoride (PVDF). The merits of the PVDF material include good repeatability, high sensitivity, high linearity, flexibility, and low cost. See "Tactile Sensor State of the Art" by Sanjeev M. Gorhe and D. P. Goel, 1987.

As a precaution, the outer surface will also be equipped with slip detection sensors; in normal operation, these sensors will not be needed. However, to ensure robust operation, a conventional slip detection sensor based on acoustic emission vibration detection can be used. When an object moves across the surface of the sensor, the mechanical changes set up vibrations which are then detected by a microphone.

Thin Film Variable Capacitance Shear Force Sensors can be used to monitor the distortion of the cells before lifting the object. Such sensors as shown, for example, in *A Thin-Film Variable Capacitance Shear Force Sensor for Medical and Robotic Application,* by Ken-Ichi Akasofu and Michael R. Neuman, 1991, Annual International Conference of the IEEE Engineering in Mechanics and Biology Society, October 31–November 3, New York, N.Y., IEEE, 1601–1602. The small size of the sensors make them suitable for this application. In their paper, Akasofu and Neuman describe an application where they used 2 mm wide capacitive plates in a device fabricated using thin film microelectronic technology. The sensor consists of two planar polyimide substrates upon which gold capacitor electrodes are deposited. The capacitors are arranged in a bridge circuit such that when no shear force is applied between the two substrates, the bridge is balanced. A shear force results in one of the substrates shifting with respect to the other causing the bridge to go out of balance.

To monitor the pressure inside the cells, a Bipolar Integrated Silicon Pressure Sensor can be used. See "A Bipolar Integrated Silicon Pressure Sensor", by Moon Key Lee and Bo Na Lee, *Sensors and Actuators A.,* 34, 1–7, 1992. In this sensor, the piezoresistive sensing system and the signal-conditioning circuitry is fabricated in a single chip (2.96 mm×2.34 mm). The diaphragm size is 1 mm×1 mm. The sensor compensates automatically for the temperature dependence of the sensitivity in the piezoresistors, and for the supply voltage variations. The sensor produces pulse wave output with a frequency linearly proportional to the pressure applied to the diaphragm.

Underneath the outer surface is the membrane comprised of cells filled with compressible fluid. The cell walls of the membrane are made of thin, lightweight, flexible, and non-elastic material. A strong, durable nylon fabric described in U.S. Pat. No. 4,758,465 can be used. This fabric is comprised of a fabric substrate with a base coat and a top coat applied to each surface. The fabric weighs 191.8 grams per square meter (6.19 ounces per square yard), has a breaking strength of 1040.9 Newtons (234 pounds), and a tearing strength of 50.7 Newtons (11.4 pounds).

The compressible fluid inside the cells may be any gas (for example, air) which exhibits close to ideal gas behavior in low pressures. The initial pressure inside the cells can be set to 1 atmosphere (absolute pressure) for light duty application. For heavy duty use, the higher the initial pressure, the less the weight of the object will distort the cells.

Computer simulation

A computer program was written to simulate the functionality of the design. In the calculations, a conservative value of 0.75 for coefficient of static friction $\mu$ was used (steel on steel has a $\mu$ of 0.74). By covering the outer surface with a rubber-like material, much larger coefficients of friction can be achieved. In the simulation the rate of compression is set to be twice the rate of lifting to ensure sufficient friction force.

The following membrane dimensions are used:

thickness: 1 cm side Area: 25 cm$^2$ volume: 25 cm$^1$

From FIG. 4, the pressure required inside the cells to lift the object is calculated as:

$$f_s = \frac{\text{load}}{2}$$

$$f_s = n \times \mu_s$$

$$\Rightarrow n = \frac{f_s}{\mu_s}$$

also, $$n = P_{load} \times A_m$$

$$\Rightarrow P_{load} = \frac{n}{A_m}$$

where, $f_s$=friction force n=normal force $\mu_s$=coefficient of static friction (0.75)

$P_{load}$=pressure inside the cells $A_m$=area of the membrane in contact with the load (FIG. 5)

The following model is used in the simulation until the pressure reaches the critical value $P_{load}$. The dimensions of one cell column were used to derive the variables to simplify calculations. Only the outside dimensions are considered. From FIG. 5:

$$A = 5 \times A_p + 2 \times A_s$$

$$A_p = x \times 1$$

where,

A=end area of the cell column $A_p$=area of parallelograms $A_s$=area of segments From FIG. 6, with some algebra, the following relationships can be obtained to derive the area of the segment, $A_s$ (FIG. 5).

$$y = 0.5 \times (1 - x) \qquad (1)$$

$$c = \frac{x}{\cos\left(\tan^{-1}\left(\frac{y}{x}\right)\right)} \qquad (2)$$

Figure 7:
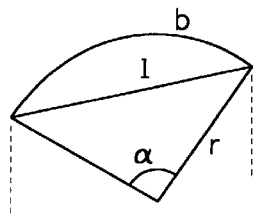
FIG. 7 is a schematic representation of some of the variables used in the computer simulation to derive the volume of the cubic cells.

Since the top and the bottom surface of the membrane is made of flexible but non-elastic material, it tends to curve under increased pressure inside the cells maintaining the length of 1 cm. From FIG. 7:

$$b = \alpha \times r = 1 \qquad (3)$$

$$\Rightarrow \alpha = \frac{1}{r}$$

$$r = \frac{c}{2 \times \sin\left(\frac{1}{2 \times r}\right)}$$

where, b=length of curve r=radius $\alpha$=center angle c=length of chord

Equation (3) can be solved by Newton's Method by letting $$f(r) = r - \frac{c}{2 \times \sin\left(\frac{1}{2 \times r}\right)}$$

$$f'(r) = 1 - \frac{c \times \cos\left(\frac{1}{2 \times r}\right)}{4 \times \left[r \times \sin\left(\frac{1}{2 \times r}\right)\right]^2}$$

Then, $$r_{k+1} = r_k - \frac{f(r_k)}{f'(r_k)}$$

where, f'(r)=derivative of f(r)

The area of the segment can be calculated as, $$A_s = \frac{r}{2} - \frac{c}{2} \times \cos\left(\frac{1}{2 \times r}\right)$$

The area of the end of the cell column then becomes, $$\Rightarrow A = 5 \times x + r - c \times r \times \cos\left(\frac{1}{2 \times r}\right) \qquad (4)$$

Figure 8:
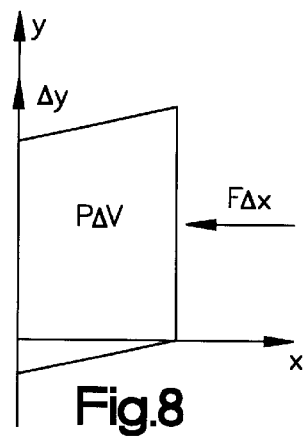
FIG. 8 is a schematic representation of the forces applied to the cubic cells when the object is lifted.
Figure 9:
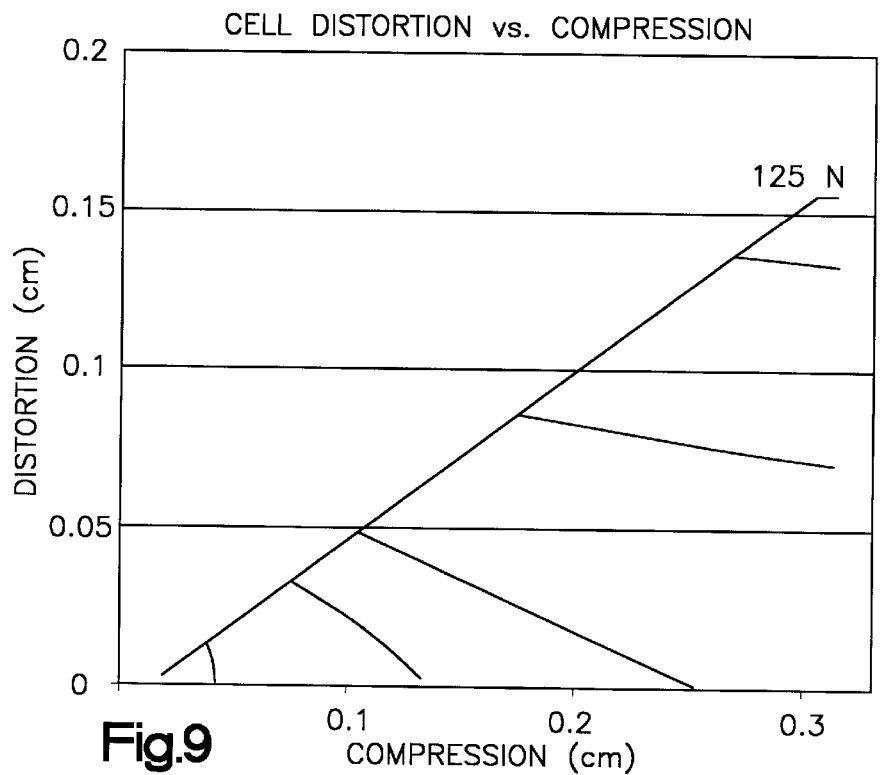
FIG. 9 is a graphical representation of the simulated lifting of several different loads by the present invention.

By using Ideal Gas Law, PV=nRT, and assuming isothermal compression, $$P_i \times V_i = P_f \times V_f$$

$$V_i = A_i \times 5 \text{ cm}^3$$

$$V_f = A_f \times 5 \text{ cm}^3$$

$$\Rightarrow P_f = \frac{P_i \times V_i}{V_f}$$

where, $P_i$=initial pressure (1 atm)
$P_f$=final pressure
$V_i$=initial volume of the membrane (25 cm$^3$)
$V_f$=final volume
$A_i$=initial end area of cell column (5 cm$^2$)
$A_f$=final area At this point, the pressure inside the cells is equal to $P_{load}$, large enough to lift the object. To observe what happens when compressing force is further applied to the membrane, the following work relationships are used. As it can be seen from FIG. 8, the sum of the work done to the system and the work done by the gas is equal to the work done by friction force to lift the load. To facilitate computations, the origin is shifted up by the amount of distortion.

$$F\Delta x + P\Delta V = f_s \Delta y \quad (5)$$

where,

F=gripping force
P=pressure inside the membrane
$f_s$=friction force
dV=incremental change in volume
dx=increment in x
dy=increment in y Equation (5) cab be expressed as $$\Delta y = \frac{F\Delta x + P\Delta V}{f_s} \quad (6)$$

Since both P and $\Delta V$ depend on $\Delta y$, the equation (6) can be solved by Newton's Method. To make computations easier, the pressure is assumed to be constant during each incremental iteration.

$$F = P \times A, \text{ and } \Delta V = V_f - V_i = (A_f - A_i) \times 25 \text{ cm}^3$$

After proper unit conversions, $$f(\Delta y) = \Delta y - \left(\frac{100}{f_s}\right) \times P \times \quad (7)$$
$$(2.5 \times 10^{-5} \times \Delta x + 5 \times 10^{-6} \times (A_f - A_i))$$

where, Af is obtained from (2), (3), and (4) by letting $$x_{k+1} = x_k - \Delta x$$

and $$y_{k+1} = y_k + \Delta y$$

The derivative of $f(\Delta y)$ can be computed as $$f'(\Delta y) = \frac{f(\Delta y + dy) - f(\Delta y)}{dy}$$

Then, $$\Delta y_{k+1} = \Delta y_k - \frac{f(\Delta y)}{f'(\Delta y)}$$

The entire disclosure of the technical paper entitled "The Design and Development of an Adaptive Gripper for a Robotic Manipulator" given at the Fifth World Conference on Robotics Research, Sept. 27–29, 1994, Cambridge, Mass., copy attached, as well as the disclosures of each paper listed in the bibliography thereof, are incorporated herein by reference.

What is claimed is:

1. A robot gripper comprising:

two gripper surfaces each having a flexible, non-elastic membrane disposed thereon and positioned so that an object to be gripped is located between the gripper surfaces said membrane being formed by cells having walls made of non-elastic, flexible material, said cells being filled with a compressible fluid; and means to move the gripper surfaces simultaneously towards the object to be gripped and in an upward direction relative to the object to be gripped so that the gripper surfaces make contact with the object to be gripped and simultaneously apply compression and lifting forces to the object.

2. The robot gripper as defined in claim 1, wherein said flexible, non-elastic membrane is composed of cubic cells whose walls are made of non-elastic, flexible fabric and are filled with a compressible fluid.

3. The robot gripper as defined in claim 2, wherein a means to monitor said distortion of said flexible, non-elastic membrane disposed on each gripper surface is located on said flexible, non-elastic membrane.

4. The robot gripper as defined in claim 3, wherein said non-elastic, flexible fabric comprises a substrate comprised of woven synthetic nylon fibers, a base coat containing polyurethane adhesion binder and a top coat containing a flame retardant binder.

5. The robot gripper as defined in claim 4, wherein said compressible fluid is a gas.

6. The robot gripper as defined in claim 5, wherein said compressible fluid is air.

7. The robot gripper as defined in claim 6, wherein said means to monitor said distortion of said flexible, non-elastic membrane disposed on each gripper surface is a thin film variable capacitance shear force sensor.

8. The robot gripper as defined in claim 1 wherein the cells of said membrane have front faces for operatively engaging the object to be gripped and rear faces in operative relationship with said means to move the gripper surfaces, and further wherein said means to move said gripper surfaces is adapted to generate a shear force acting between the front and rear faces of said cells which causes a lateral distortion of said front and rear faces with respect to one another, said means to move the gripper surfaces being further adapted to increase said compression and lifting forces until the distortion of said front and rear faces with respect to one another begins to decrease.

* * * * *